United States Patent [19]
Wilber

[11] 3,873,990

[45] Mar. 25, 1975

[54] CHROMINANCE SIGNAL CORRECTION

[75] Inventor: James Albert Wilber, Indianapolis, Ind.

[73] Assignee: RCA Corporation, New York, N.Y.

[22] Filed: Aug. 31, 1973

[21] Appl. No.: 393,626

[30] Foreign Application Priority Data

Sept. 6, 1972 United Kingdom .............. 41428/72

[52] U.S. Cl. .......................................... 358/8, 360/36

[51] Int. Cl. .............................................. H04n 5/76

[58] Field of Search ...... 178/5.4 CD, 6.6 TC, 6.6 P, 178/69.5 CB, 5.2 A; 360/27, 30, 36, 126; 358/8

[56] References Cited

UNITED STATES PATENTS

| | | | |
|---|---|---|---|
| 2,892,022 | 6/1959 | Houghton | 178/5.4 |
| 3,697,673 | 10/1972 | Dann | 178/5.4 |
| 3,786,176 | 1/1974 | Narahara et al. | 178/5.4 |

*Primary Examiner*—Robert L. Griffin
*Assistant Examiner*—R. John Godfrey
*Attorney, Agent, or Firm*—Eugene M. Whitacre; William H. Meagher

[57] ABSTRACT

In a video disc player, a recorded composite signal, recovered during disc playback, includes a chrominance signal component buried in the midband of the accompanying luminance signal component. The player includes video processing circuits converting the recovered signal to an output composite signal in which the chrominance signal component occupies a higher frequency band, and employing the step of heterodyning the recovered chrominance signal with oscillations at a nominal frequency of $f_s + f_s'$ (where $f_s$ is the color subcarrier frequency of the output, and $f_s'$ is the buried color subcarrier frequency of the disc signal). To stabilize the output chrominance signal component against spurious frequency variations accompanying disc playback, a phase locked loop (PLL) system is established to cause the $f_s + f_s'$ oscillations to track the disc frequency variations. The PLL system employs a voltage controlled oscillator (VCO) operating at a nominal frequency of $f_s + f_s'$, and responding to the output of a phase detector, comparing the synchronizing burst component of the output chrominance signal with the highly stable output of a reference oscillator operating at $f_s$. The recorded synchronizing burst component includes bursts of conventional short duration following each horizontal sync pulse but additionally includes an elongated burst component (of the same subcarrier frequency and phase) occupying a line interval during the "backporch" portion of the vertical blanking interval. The PLL system phase detector is supplied with both short and elongated burst components through use of appropriate line rate and field rate gating of the output chrominance signal. Presence of elongated burst component in the phase detector input substantially precludes "sidelock" condition (i.e., PLL system locking to a sideband component of the color synchronizing waveform under turn-on conditions when turntable speed is incorrect, and maintaining such a locked state as speed is corrected).

4 Claims, 2 Drawing Figures

CHROMINANCE SIGNAL CORRECTION

Figure 1:
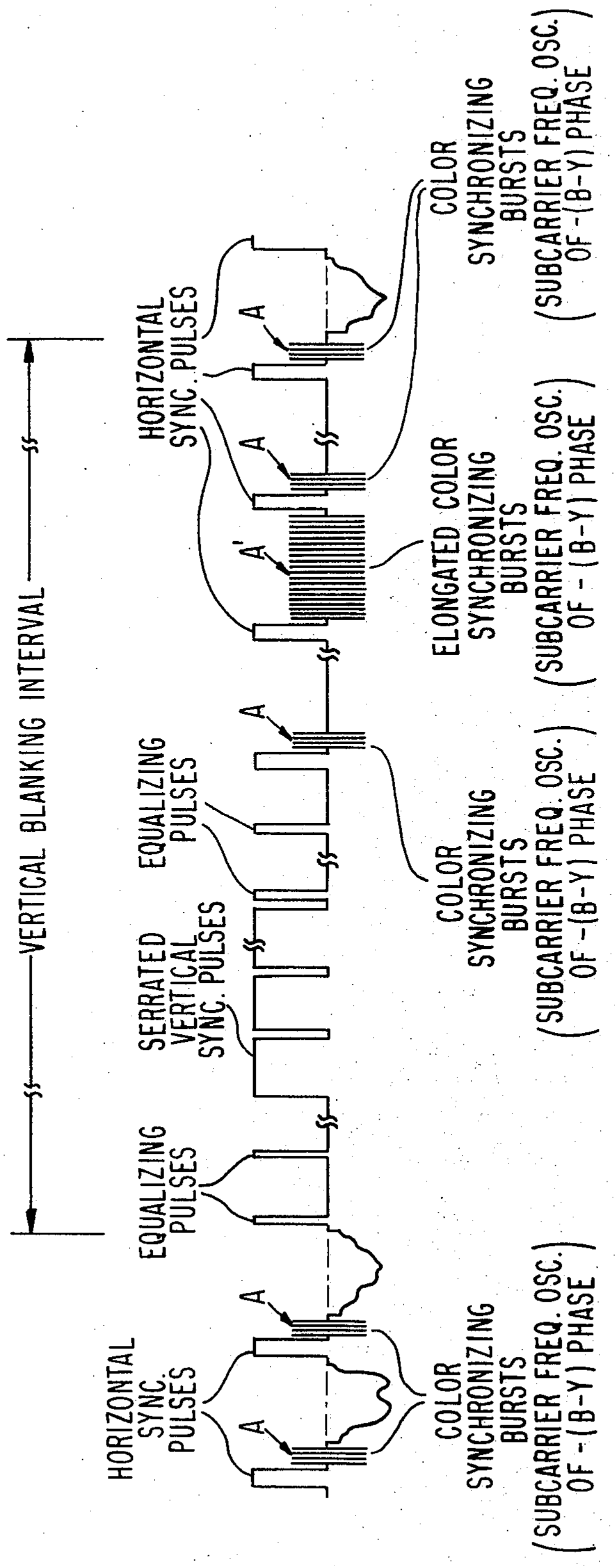

The present invention relates generally to chrominance signal correction techniques and apparatus therefor, and particularly to such techniques and apparatus suitable for use in correcting frequency jitter or chrominance signal components of composite video signals developed upon playback of a video disc record.

In U.S. Pat. No. 3,711,641, issued to Richard C. Palmer on Jan. 16, 1973, a video disc player system is described in which a capacitance varies in value with information recorded on a video disc, the variations altering the response of a resonant circuit (incorporating the capacitance) to an injected fixed frequency RF signal. A peak detector detects the resultant amplitude variations of the RF signal to recover the recorded information. Illustratively, the variable capacitance is, as described in copending U.S. Pat. application Ser. No. 126,772, filed Mar. 22, 1971 for Jon K. Clemens, the capacitance exhibited between a conductive electrode surface on a pickup stylus and a conductive surface of the disc, the capacitance varying, as the disc is rotated, in accordance with geometry variations in the bottom of the disc groove representative of the recorded information.

It will be appreciated that errors in the relative velocity between pickup stylus and disc groove during the disc playback can result in spurious variations in the frequencies of the recovered signal components. One manner of reducing such errors is to employ a speed correction system involving adjustment of the rotational speed of the disc-supporting turntable in an error-compensating direction. Illustrative of such a rotational speed adjusting system is the speed control system described in copending U.S. Pat. application Ser. No. 284,510, filed on Aug. 29, 1972 for Billy W. Beyers, Jr. (now U.S. Pat. No. 3,829,612, issued Aug. 13, 1974.)

Another manner of reducing such errors involves corrective adjustment of the positioning of pickup stylus and is described in the aforesaid Palmer patent (U.S. Pat. No. 3,711,641). The system of the Palmer patent includes detection means for detecting the velocity of the record groove relative to the pickup means. Circuit means are coupled to the detection means to develop an error signal when the detected velocity differs from a desired velocity. Electromechanical transducing means are mechanically coupled to the signal pickup means and electrically coupled to the circuit means. The transducing means is responsive to the error signals from the circuit means to vary the position of the signal pickup means along the disc groove in a manner to hold the relative velocity between the pickup means and the record groove substantially at the desired velocity. A system of the type described in the Palmer patent is herein referred to as an "armstretcher" system in that the velocity error correcting technique employed effectively serves to variably stretch the pickup arm in the disc player.

In operation of video disc players of the variable capacitance type disclosed in the aforesaid Clemens application, it has proved desirable to employ a combination of the above described velocity error correction techniques, i.e., to employ a turntable speed control system to stabilize average velocity supplemented by an armstretcher system to overcome particularly bothersome cyclical velocity variations. In an illustrative player employing such a combination, a turntable speed control system of the type disclosed in the aforesaid Beyers application utilizes an eddy current brake to controllably reduce the turntable rotational speed from a free-running speed chosen to be normally above the desired operating speed. In operation, the controllable braking system reliably holds the average stylus-groove velocity within $\pm 0.1\%$ of the desired velocity for a given groove diameter. When the controllable braking system action is then supplemented by operation of the armstretcher system, cyclical variations of the relative stylus-groove velocity at the once-around frequency (e.g., 7.5 Hz.) and harmonics thereof may be held within similar tolerances.

While the aforesaid velocity error correcting combination is thus capable of correcting frequency jitter of the recovered signal components to a degree sufficient to reasonably ensure, for example, the ability to effect horizontal deflection synchronization in a typical commercial color television receiver (to which the recovered signals may ultimately be applied), it has proved desirable to provide further stabilization against jitter effects for the chrominance signal components of a recorded composite color television signal.

In copending U.S. application Ser. No. 351,036, filed Apr. 13, 1973 for John G. Amery, et al., player apparatus is disclosed for processing a composite color video signal recovered during playback of a video disc, the composite signal having been encoded per a format wherein a chrominance signal in the form of a modulated subcarrier is buried in spectrum troughs in the midband of a wider band luminance signal. The processing circuits serve to convert an input composite signal of burried subcarrier format to an output composite signal of NTSC format, with comb filtering employed to separate the buried subcarrier chrominance signal from midband luminance signal components. To preclude the "jitter" of played back signals from disturbing the accuracy of the comb filter separating action, heterodyning of the recovered buried subcarrier composite signal (or a portion thereof) with local oscillations precedes comb filtering. The source of local oscillations is caused to have substantially the same "jitter" as the recovered signal components, by rendering the local oscillation source responsive to the frequency variations suffered by the color synchronizing component which accompanies the buried subcarrier chrominance signal. The product of heterodyning with such local oscillations is substantially jitter-free; comb filtering of the product may be carried out with crosstalk freedom relatively independent of the original "jitter."

By appropriate choice of the nominal frequency of the local oscillations, the heterodying step that effects jitter stabilization may also serve to shift the chrominance signal from its midband location in the input (buried subcarrier) format to the highband location desired for the output (e.g., NTSC) format, whereby subsequent comb filtering (in the highband spectral region) to eliminate luminance signal components provides a highband chrominance signal for direct inclusion in an output composite signal.

The present invention is directed to apparatus for effecting the jitter stabilization of the Amery, et al. arrangement in a reliable manner in the face of the frequency deviations that may be encountered in practical realizations of the player apparatus. Pursuant to the principles of the present invention, the desired stabilization is effected by a phase-locked loop (PLL) system configured in a manner ensuring the ability to reliably achieve and maintain proper locked operation without the need for customer operated controls, while avoiding "sidelock"during start-up.

Illustratively, the local oscillations, with which the input composite signal of buried subcarrier format is heterodyned, vary about a nominal frequency of $f_s+f_s'$, where $f_s'$ is the nominal buried subcarrier frequency of the recorded signal and $f_s$ is the desired output subcarrier frequency. With a desirable choice for the buried subcarrier frequency being 195/2 times the horizontal scanning frequency $f_H$, (i.e., approximately 1.53 MHz, when $f_H$ corresponds to the line scanning frequency of the U.S. color television broadcast standards), while an appropriate choice for the output subcarrier frequency is the NTSC value of 455/2 $f_H$ (approximately 3.58 MHz, for the indicated $f_H$ choice), the sum frequency for the local oscillations with such choices is 325 $f_H$ (corresponding to approximately 5.11 MHz.).

In the absence of jitter the input composite signal frequencies, the heterodyning of the input composite signal with the $(f_s+f_s')$ oscillations provides a difference frequency product in which chrominance information appears as modulation of a subcarrier at the NTSC value of 3.58 MHz., with the accompanying color synchronizing component appearing as recurring bursts of the 3.58 MHz. subcarrier with a fixed phase and a reference amplitude. By suitably gating the aforesaid difference frequency product of the heterodyning action during the recurring burst intervals, the $f_s$ color synchronizing component may be separated therefrom for phase comparison with the output of a highly stable reference oscillator operating at $f_s$.

In the presence of jitter of the input composite signal frequencies, the phase comparator output provides a control voltage output to be utilized in varying the frequency of the local oscillations source in a direction to minimize subcarrier frequency change in the heterodyne product. A closed loop is thereby completed which may serve to hold the color synchronizing component of the heterodyne product in frequency (and phase) synchronism with the stable reference oscillator output.

In implementing such a phase locked loop system, however, in the setting of a video disc player of the form previously described, a variety of problems must be confronted that arise from the nature of the player operations.

One of the problems that must be confronted is the problem of "sidelock." To appreciate the nature of the "sidelock" problem, it should be appreciated that the frequency spectrum of the color synchronizing component output of the burst separator in the above-described PLL system includes not only the frequency of the subcarrier but also a plurality of sideband frequencies differing from the subcarrier by integral multiples of $f_H$. Appearing with significantly high energy content are sideband frequencies separated from the subcarrier by $1f_H$.

When the relative stylus-groove velocity is correct, the composite signal recovered upon playback will include a color synchronizing component having a subcarrier component at the desired buried subcarrier frequency $(f_s')$ and high energy content sideband components at frequencies of $f_s' - f_H$ and $f_s' + f_H$. However, when using the above-described type of turntable speed control system, there is a start-up condition when the turntable is rotating at a higher than normal speed and the speed control braking system is just coming into operation. Illustratively, under such conditions, the subcarrier component (and its accompanying sidebands) may be 1% higher in frequency than their desired values. With such a 1% increase, a lower sideband component frequency, normally at $f_s' - f_H$, will be quite close to falling at the $f_s'$ value (and indeed much closer to that frequency value than the subcarrier component itself). Similarly, in the selected heterodyne product, the lower sideband component of the synchronizing signal can be much closer to a frequency value of $f_s$ than the subcarrier component itself. This presents the danger that the phase-locked loop may lock to a lower sideband component of the synchronizing signal rather than to the subcarrier frequency component thereof, and may remain locked to the lower sideband component as the velocity is corrected.

Pursuant to the principles of the present invention, a solution to the aforesaid "sidelock" problem is provided by (1) incorporating in the recorded composite signals a color synchronizing component including, in addition to the subcarrier bursts of conventional short duration following each horizontal sync pulse, an elongated burst component (of the same subcarrier frequency and phase) occupying one or more line intervals during the backporch portion of the vertical blanking intervals; and (2) supplying the phase detector of the jitter-correcting PLL system in the player with both short and elongated burst components through use of appropriate line rate and field rate gating of the output chrominance signal. By inclusion of the elongated burst components in the gated waveform supplied to the phase detector input, the spectrum of the supplied waveform is altered (relative to that provided by line rate gating only) to enhance the ratio of subcarrier component amplitude to sideband component amplitude, substantially lessening the likelihood of sidelock maintenance.

Figure 2:
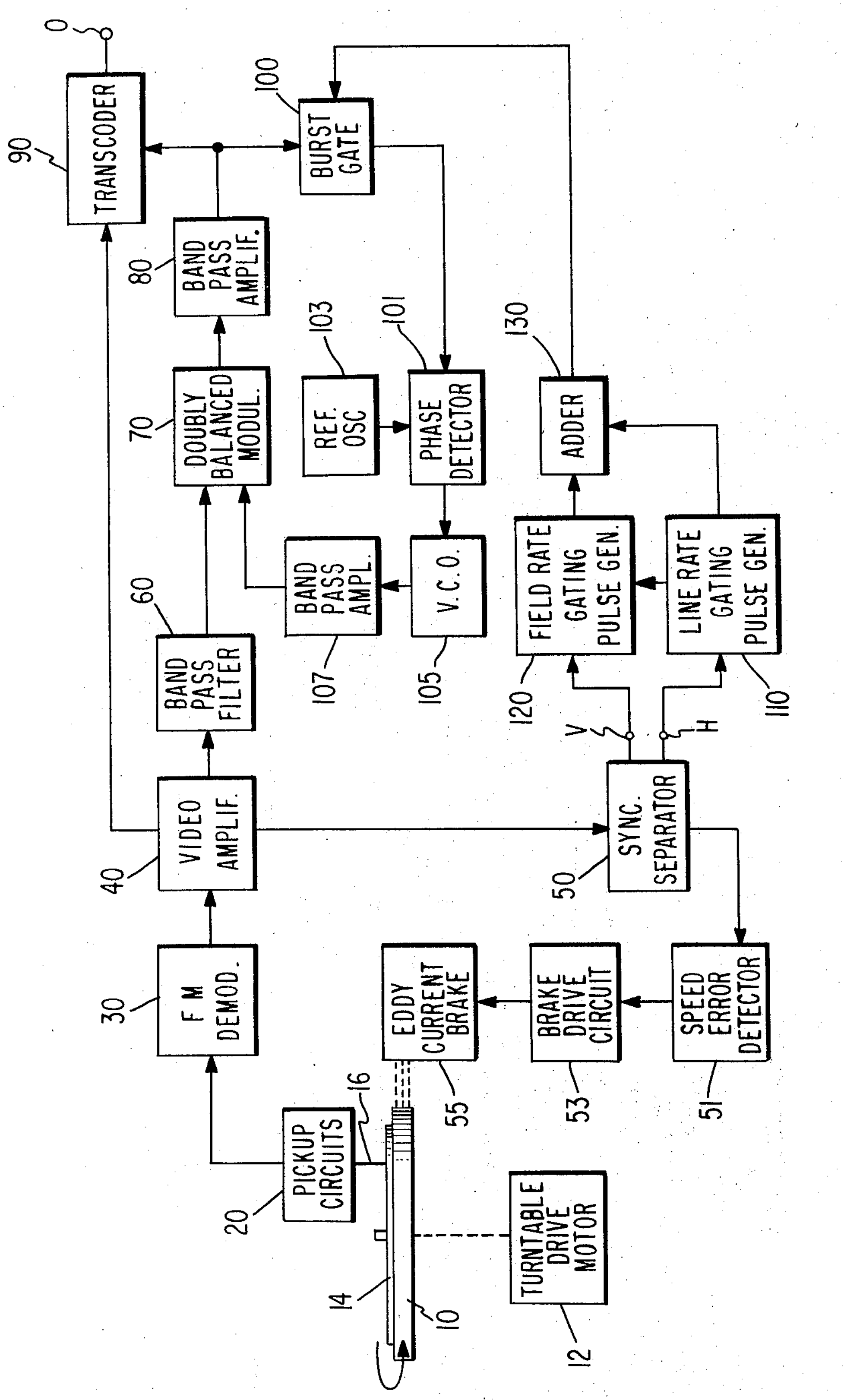

Objects and advantages of the present invention will be recognized by those skilled in the art upon a reading of the following detailed description and an inspection of the accompanying drawings in which:

FIG. 1 illustrates a composite video signal waveform inclusive of color synchronizing information in a form suitable for recording use pursuant to the principles of the present invention; and FIG. 2 illustrates, in block diagram form, video disc player apparatus incorporating a chrominance component correction system, the correction system utilizing color synchronizing information of the form shown in FIG. 1 in accordance with an embodiment of the present invention.

In FIG. 1, a portion of a composite color television signal waveform is illustrated, the illustrated portion particularly including an indication of the waveform appearance during the occurrence of a vertical blanking interval.

As the illustration suggests, outside the vertical blanking interval, color synchronizing information is present in the form of bursts (A) of subcarrier frequency oscillations of a reference phase, e.g. the −c-B–Y) phase, each burst occupying a "backporch" location in a horizontal blanking interval following the occurrence of a horizontal sync pulse.

Within the vertical blanking interval, during the appearance of a serrated vertical sync pulse, as well during the equalizing pulse intervals immediately preceding and following the vertical sync pulse appearance, no color synchronizing information is present. However, during the "backporch" portion of the vertical blanking interval subsequent to equalizing pulse appearance, which subsequent "backporch" portion includes a time interval corresponding to a plurality of line intervals (e.g., 10–12), color synchronizing information does appear in association with the appearance of horizontal sync pulses. Pursuant to the principles of the present invention, the color synchronizing information present during this "backporch" portion of the vertical blanking interval includes at least one elongated burst (A'), of the same subcarrier frequency and reference phase as the previously mentioned short duration bursts but of a greater duration substantially fully occupying a line interval intervening between successive horizontal sync pulses. For purposes of drawing simplicity, only one such elongated burst has been shown in FIG. 1; however, it should be recognized that desirably a multiplicity of the line intervals occurring during the noted backporch portion of the vertical blanking interval may be occupied by such elongated bursts. As suggested by the illustration, those horizontal sync pulses occurring during the noted backporch portion but not followed by an elongated burst component may desirably be followed by a conventional short duration burst component.

For an explanation of how color synchronizing information of the FIG. 1 form described above may be advantageously employed in video disc player apparatus, attention is directed to the player arrangement illustrated in FIG. 2.

In FIG. 2, a turntable 10 is diagrammatically represented as being rotated by a turntable drive motor 12 suitably mechanically coupled thereto. A video disc record 14 is supported on the turntable 14 for rotation therewith, and receives in a spiral groove on its surface a stylus 16 (diagrammatically represented) which is electrically coupled to pickup circuits 20.

The disc 14, stylus 16, and pickup circuits 20 are, illustratively, of the general form disclosed in the aforesaid Clemens application, whereby, as the disc is rotated, capacitance variations occur in accordance with information recorded as geometry variations in the groove bottom, the capacitance variations alter the response of a resonant circuit (incorporating the varying capacitance) to an injected RF signal, and the resultant amplitude variations of the RF signal are detected to recover the recorded information.

The information recorded in the groove bottom of the video disc 14 desirably is in the form of a carrier frequency modulated in accordance with a composite color television signal. The frequency modulated carrier wave output of pickup circuits 20 accordingly is applied to an FM demodulator 30 to develop at the demodulator output terminal a composite color television signal output.

The composite color television signal appearing at the output terminal of demodulator 30 is amplified in video amplifier 40 and delivered therefrom to a plurality of utilization circuits, including a sync separator 50. Sync separator 50 separates from the recovered composite signal a first synchronizing component comprising horizontal sync pulses which appear at separator output terminal H, and a second synchronizing component comprising vertical sync pulses which appear at separator output terminal V. The sync separator 50 also provides a periodic signal output for turntable speed control purposes. Such periodic signal output, which illustratively comprises pulses recurring at the desired line rate ($f_H$) when the relative stylus-groove velocity is correct, is applied to a speed error detector 51 (which cooperates with a brake drive circuit 53 and an eddy current brake 55, in a manner to be subsequently described, to form a turntable speed control system of the form disclosed in the previously mentioned Beyers application).

The speed error detector 51 monitors the spacing between successive pulses in the output of sync separator 40, as, for example, by comparing the input and output of a 1H delay line to which the pulse train is fed, to determine departures from correct spacing as an indication of departure of the stylus-groove velocity from the desired relative velocity. The output of speed error detector 51 controls the energization of the eddy current brake 55 by means of a brake drive circuit 53. The eddy current brake 55 cooperates with the conductive turntable 10 to controllably retard the turntable rotation relative to its free-running speed (which is set slightly higher, e.g., 1%, than desired for normal signal playback), responding to changes in the speed error detector output in a compensating sense. The controllable braking system primarily corrects long term variations in the relative stylus-groove velocity to hold the average velocity correct within close tolerances (e.g., within 0.1 % as previously mentioned). In a typical turn-on sequence, the turntable drive motor 12 brings the turntable up to its free-running speed prior to stylus touch-down in the disc groove. After stylus touch-down, pulses fed to the speed error detector 51 provide a correcting energization of the eddy current brake 55, slowing the turntable 10 to bring the stylus-groove velocity toward its correct value.

In the player arrangement of FIG. 2, a composite color television signal output of video amplifier 40 is applied to a bandpass filter 60, having a passband encompassing the band of frequencies occupied by the chrominance component of the composite signal. The composite signal recovered from the record is in the "buried subcarrier" format described in the aforesaid Amery, et al. application wherein the chrominance signal, in the form of a modulated subcarrier, is buried in spectrum troughs in the midband of a wider band luminance signal. The accompanying color synchronizing component comprises bursts of reference phase oscillations at the buried subcarrier frequency $f_s'$ (occupying both short and elongated intervals, as previously described in connection with FIG. 1). Illustratively, the nominal value chosen for $f_s'$ is 195/2 times the horizontal scanning frequency $f_H$ (i.e., approximately 1.53 MHz., when $f_H$ corresponds to the line scanning frequency of the U.S. color television broadcast standards). The passband of band pass filter 60 may thus appropriately be centered about 1.53 MHz. and of sufficient width (e.g., approximately 1–2 MHz.) to pass both upper and lower sidebands of the buried subcarrier. Accompanying these chrominance signal components in the output of band pass filter 60 are luminance signal components which share, in interleaved fashion, the midband of the recorded composite signal.

Practical tolerances with respect to the accuracy of the disc center-hole location relative to the convolutions of the spiral groove of the disc 14 result in the likelihood of some slight degree of offcentering, with the consequence of a cyclical variation in the relative stylus-groove velocity at the "once-around" frequency. When employing a video disc rotation rate of 450 rpm., which has proved desirable, the associated "once-around" frequency is 7.5 Hz. Record warp conditions typically encountered also result in cyclical velocity variations at the once-around frequency, as well as harmonics thereof (e.g., 15 Hz. and 30 Hz.). Because of the relatively large mass of the turntable, it is difficult to adequately correct cyclical velocity variations at these frequencies via a turntable speed control system (such as shown in FIG. 2). Accordingly, it has proved desirable to provide additional velocity correcting apparatus to correct these cyclical variations; e.g., by varying the position of the relatively light mass stylus along the groove in a variation opposing manner, as in the previously described "armstretcher"system of the Palmer patent. While the player of FIG. 2 may thus desirably employ such an armstretcher system in addition to the illustrated turntable speed control system, it may be anticipated that the reduction of undesired variations in relative velocity by the described systems may leave residual variations in relative stylus-groove velocity of the order of $\pm 0.1\%$ about the correct velocity.

The consequence of such residual velocity variations is that spurious variations of the signal frequencies recovered from disc 14 will be present in the same order. Thus, for example, the buried subcarrier sideband frequencies in the recovered composite signal output of video amplifier 60 may be subject to "jitter" about their otherwise expected locations in the frequency spectrum, with the accompanying luminance signal component frequency locations subject to a similar jitter. Such jitter poses a problem when it is desired to transcode the recovered signals from the buried subcarrier format to another format compatible with color television receiver circuitry. While comb filtering of the midband portion of the recovered signals may permit accurate separation of the interleaved luminance and chrominance signal components when the frequency stability of the recovered signals is assured, the presence of jitter can jeopardize attainment of the requisite accuracy of separation.

As previously noted, a solution to the problem of jitter effects on signal separation is disclosed in the aforementioned Amery, et al. application, wherein heterodyning of at least the midband portion of the recovered composite signal with local oscillations, which are caused to have substantially the same jitter as the recovered signal components, provides a substantially jitter-free product. Comb filtering of the product can achieve the desired signal separation with crosstalk freedom relatively independent of the original jitter. The noted heterodyning action is effected in the FIG. 2 apparatus herein by doubly balanced modulator 70, which accepts the midband signal output of bandpass filter 60 for heterodyning with oscillations supplied by a voltage controlled oscillator (VCO) 105 via bandpass amplifier 107. In the absence of jitter of the recovered signal frequencies, the frequency of oscillations supplied by VCO 105 desirably corresponds to the sum of the buried subcarrier midband frequency ($f_s'$) and a desired output subcarrier highband frequency ($f_s$), whereby in the difference frequency product of modulation a subcarrier frequency of $f_s$ results. The difference frequency product of modulation, comprising the midband chrominance signal components shifted to a highband location centered about $f_s$ (accompanied by the interleaved midband luminance signal components, similarly shifted in frequency), is selectively passed by band pass amplifier 80 to transcoder apparatus 90.

Illustratively, transcoder 90 includes (in correspondence with apparatus disclosed in said Amery, et al application) a chrominance comb filter having multiple pass bands centered about odd multiples of half the line frequency ($f_H$). Application of the output of band pass amplifier 80 to the chrominance comb filter provides an output comprising a highband chrominance signal free of the accompanying presence of frequency shifted midband luminance signal components. As illustrated, transcoder 90 also receives a composite signal output of video amplifier 40; by appropriate comb filtering of this signal in transcoder 90, a luminance signal is obtained which is free of the accompanying presence of (midband) chrominance signal components. Addition of this combed luminance signal to the highband chrominance signal output of the chrominance comb filter provides an output composite signal at output terminal O suitable for color television receiver use. Illustratively, the combed luminance signal may be obtained in transcoder 90 by a subtractive process, combining the composite signal output of video amplifier 40 in a subtractive sense with the combed chrominance signal (after return of the latter to a midband location via a second heterodyning with an output of VCO 105).

In the presence of jitter of the signal frequencies recovered by disc playback, it is desired that the frequency of oscillations developed by VCO 105 correspondingly jitters about the ($f_s' + f_s$) value, so that the modulation product selected by bandpass amplifier 80 is substantially jitter free. To this end, the VCO frequency is rendered responsive to the control voltage output of a phase detector 101, which compares the output of a reference oscillator 103, operating with high frequency stability at the desired output subcarrier frequency ($f_s$), with the color synchonizing component of the (frequency shifted) signal output of bandpass amplifier 80. Illustratively (e.g., for use with color television receivers of the NTSC type), $f_s$ corresponds to the NTSC subcarrier frequency of $455/2\, f_H$ (or approximately 3.58 MHz.), and oscillator 103 is crystal controlled to operate at that frequency. A burst gate 100, coupled to the output terminal of band pass amplifier 80, passes to phase detector 101 (by appropriate time selection) desired color synchronizing information, to the substantial exclusion of accompanying picture information.

Pursuant to the principles of the present invention, the desired color synchronizing information input for phase detector 101 includes not only the short duration subcarrier frequency burst components A, such as conventionally follow horizontal sync pulses during recurring picture intervals, but additionally includes elongated burst components A' occupying one or more line intervals during a post-equalizing pulse portion of the "backporch" of each vertical blanking interval. To achieve delivery of such two-fold color synchronizing information to phase detector 101, burst gate 100 is rendered responsive to a composite gating waveform developed by adder 130 from a pair of inputs comprising (1) field rate gating pulses developed by a fireld rate gating pulse generator 120, and (2) line rate gating pulses developed by a line rate gating pulse generator 110.

The line rate gating pulse generator 110 is rendered responsive to the horizontal synchronizing pulse output appearing at output terminal H of the sync separator apparatus 50 to establish line rate gating pulse initiation in appropriate time relation with horizontal sync pulse trailing edge occurrence so that the line rate component of the composite gating waveform may effect passage of burst components A to phase detector 101.

The field rate gating pulse generator 120 is rendered responsive to the vertical synchronizing pulse output appearing at output terminal V of the sync separator apparatus 50 to establish a desired "vertical backporch" timing for the field rate gating pulse appearance. An output of the line rate gating pulse generator 110 may desirably, as illustrated, be additionally supplied to generator 120 to control timing of the field rate gating pulse initiation (within the desired "vertical backporch" interval) in appropriate relation to a horizontal synchronizing pulse trailing edge. The adder 130 may include appropriate limiting circuitry to ensure a substantially constant amplitude is provided for all gate-enabling portions of the composite gating waveform.

What is claimed is:

1. In a video disc player including video disc playback apparatus for developing a composite color television signal having recurring horizontal and vertical blanking intervals and interspersed picture intervals, and including a luminance signal component, a chrominance signal component occupying a first band of frequencies, said chrominance signal component comprising sidebands of a color subcarrier, and an accompanying color synchronizing component comprising (1) short bursts of oscillations at subcarrier frequency, said short bursts having a reference phase and occurring during said recurring horizontal blanking intervals, and (2) elongated bursts of oscillations at subcarrier frequency, said elongated bursts having said reference phase and occurring during said recurring vertical blanking intervals, the time duration of each of said elongated bursts being long relative to the time duration of each of said short bursts; apparatus for deriving from said developed composite signal a frequency shifted version of said chrominance signal component and accompanying color synchronizing component, said frequency shifted version occupying a second band of frequencies different from said first band and having stabilized signal frequencies substantially independent of spurious variations of the signal frequencies of said composite signal that may occur during the development thereof by said video disc playback apparatus, said deriving apparatus comprising, in combination:

a reference oscillator operating at a reference frequency differing from the nominal color subcarrier frequency of said developed composite signal, said reference frequency lying within said second frequency band and outside said first frequency band;

a voltage controlled oscillator having an output frequency subject to variation in accordance with a control voltage input, said output frequency falling outside both of said first and second frequency bands;

a modulator coupled to said video disc playback apparatus and to said voltage controlled oscillator for heterodyning said chrominance and accompanying color synchronizing components of said developed composite signal with the output of said voltage controlled oscillator;

frequency selective means, coupled to an output of said modulator and having a passband encompassing said second frequency band to the substantial exclusion of said first frequency band, for selecting a difference frequency product of modulation comprising said frequency shifted version of said chrominance and accompanying color synchronizing components of said developed composite signal;

phase detector means having first and second inputs for developing said control voltage input for said voltage controlled oscillator in accordance with phase differences, if any, between said first and second inputs;

means for supplying an output of said reference oscillator to said phase detector means as said first input thereof; and gating means coupled to said frequency selective means for selectively passing the output of said frequency selective means to said phase detector means as said second input during the times of occurrence of said short bursts within said recurring horizontal blanking intervals and during the times of occurrence of said elongated bursts within said recurring vertical blanking intervals.

2. Apparatus in accordance with claim 1 wherein said developed composite signal also includes horizontal and vertical deflection synchronizing components, and including:

a first gating pulse generator responsive to said horizontal deflection synchronizing component of said developed composite signal for generating a line rate gating pulse output;

a second gating pulse generator responsive to said vertical deflection synchronizing component of said developed composite signal for generating a field rate gating pulse output;

means responsive to said line rate and field rate gating pulse outputs of said first and second gating pulse generators for developing a composite gating pulse waveform having line rate and field rate components;

and means for utilizing said composite gating pulse waveform to control said passing of signals by said gating means.

3. Apparatus in accordance with claim 1 also including means responsive to the output of said frequency selective means for forming an output composite color television signal in which said luminance signal component is accompanied by a chrominance signal component occupying said second frequency band.

4. In a video disc player including video disc playback apparatus for developing a composite color television signal having recurring horizontal and vertical blanking intervals and interspersed picture intervals, and including a chrominance signal component comprising sidebands of a color subcarrier, and an accompanying color synchronizing component comprising (1) short bursts of oscillations at subcarrier frequency, said short bursts having a reference phase and occurring during said recurring horizontal blanking intervals, and (2) elongated bursts of oscillations at subcarrier frequency, said elongated bursts having said reference phase and occurring during said recurring vertical blanking intervals, the time duration of each of said elongated bursts being long relative to the time duration of each of said short bursts; apparatus for deriving from said developed composite signal a frequency shifted version of said chrominance signal component and accompanying color synchronizing component, said frequency shifted version having stabilized signal frequencies substantially independent of spurious variations of the signal frequencies of said composite signal that may occur during the development thereof by said video disc playback apparatus, said deriving apparatus comprising, in combination:

a reference oscillator operating at a reference frequency differing from the nominal color subcarrier frequency of said developed composite signal;

a voltage controlled oscillator having an output frequency subject to variation in accordance with a control voltage input;

a modulator coupled to said video disc playback apparatus and to said voltage controlled oscillator for heterodyning said chrominance and accompanying color synchronizing components of said developed composite signal with the output of said voltage controlled oscillator;

frequency selective means coupled to an output of said modulator for selecting a modulation product comprising a frequency shifted version of said chrominance and accompanying color synchronizing components of said developed composite signal; and phase detector means for developing said control voltage input for said voltage controlled oscillator in accordance with phase differences, if any, between the output of said reference oscillator and the output of said frequency selective means during the times of occurrence of said short bursts within said recurring horizontal blanking intervals and during the times of occurrence of said elongated bursts within said recurring vertical blanking intervals.

* * * * *